(12) United States Patent
Hosokawa (10) Patent No.: US 12,424,611 B2
(45) Date of Patent: Sep. 23, 2025

(54) NONAQUEOUS ELECTROLYTE SECONDARY BATTERY

(71) Applicant: PRIME PLANET ENERGY & SOLUTIONS, INC., Tokyo (JP)

(72) Inventor: Takashi Hosokawa, Kako-gun (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 497 days.

(21) Appl. No.: 18/058,438

(22) Filed: Nov. 23, 2022

(65) Prior Publication Data

US 2023/0170461 A1    Jun. 1, 2023

(30) Foreign Application Priority Data

Nov. 29, 2021 (JP) .................................. 2021-193248

(51) Int. Cl.
| | |
|---|---|
| *H01M 4/13* | (2010.01) |
| *H01M 4/36* | (2006.01) |
| *H01M 10/0525* | (2010.01) |
| *H01M 10/0587* | (2010.01) |
| *H01M 50/538* | (2021.01) |
| *H01M 4/02* | (2006.01) |

(52) U.S. Cl.
CPC ............. *H01M 4/13* (2013.01); *H01M 4/366* (2013.01); *H01M 10/0525* (2013.01); *H01M 10/0587* (2013.01); *H01M 50/538* (2021.01); *H01M 2004/021* (2013.01)

(58) Field of Classification Search
CPC ........ H01M 4/13; H01M 4/366; H01M 4/364; H01M 4/362; H01M 50/538; H01M 10/0525; H01M 10/052; H01M 10/0587; H01M 10/0585; H01M 2004/021
See application file for complete search history.

(56) References Cited

U.S. PATENT DOCUMENTS

| | | | |
|---|---|---|---|
| 2012/0058375 | A1 | 3/2012 | Tanaka et al. |
| 2016/0181650 | A1 | 6/2016 | Ide |

(Continued)

FOREIGN PATENT DOCUMENTS

| | | |
|---|---|---|
| CN | 102386419 A | 3/2012 |
| CN | 105474454 A | 4/2016 |

(Continued)

*Primary Examiner* — Raymond Alejandro
(74) *Attorney, Agent, or Firm* — Finnegan, Henderson, Farabow, Garrett, and Dunner, LLP (57) ABSTRACT

The herein disclosed nonaqueous electrolyte secondary battery includes an electrode assembly in which a positive electrode including positive electrode active layers, a negative electrode including negative electrode active layers, and a separator are provided. The negative electrode active material layer includes a first area between an end side and a position 5 mm away from the end side in the width direction. An end part of the positive electrode is opposed to at least a part of the first area. A thickness T1 at a central part of the positive electrode and a thickness T2 at the end part of the positive electrode satisfy $0.95 < T2/T1 < 1.05$. Regarding the negative electrode active material layer, a basis weight M1 at a central part of the negative electrode and a basis weight M2 of an area opposed to the positive electrode active material layer of the first area satisfy $0.95 < M2/M1 < 1$.

9 Claims, 6 Drawing Sheets

(56) References Cited

U.S. PATENT DOCUMENTS

| | | | |
|---|---|---|---|
| 2018/0315984 A1* | 11/2018 | Hasegawa | H01M 10/0472 |
| 2018/0351211 A1 | 12/2018 | Kifune | |
| 2018/0358645 A1 | 12/2018 | Hasegawa | |
| 2020/0381769 A1 | 12/2020 | Kita et al. | |
| 2020/0411853 A1* | 12/2020 | Yoshikawa | H01M 4/625 |
| 2021/0036332 A1 | 2/2021 | Kawamoto et al. | |
| 2021/0305620 A1* | 9/2021 | Taniuchi | H01M 50/54 |
| 2023/0095738 A1 | 3/2023 | Kondou et al. | |

FOREIGN PATENT DOCUMENTS

| | | |
|---|---|---|
| CN | 108140903 A | 6/2018 |
| CN | 108432023 A | 8/2018 |
| CN | 112310396 A | 2/2021 |
| EP | 4 037 048 A1 | 8/2022 |
| JP | 2002-042775 A | 2/2002 |
| JP | 2014-116180 A | 6/2014 |
| JP | 2017-073330 A | 4/2017 |
| JP | 2018-056017 A | 4/2018 |
| JP | 2020-194732 A | 12/2020 |
| JP | 2021-144888 A | 9/2021 |
| WO | WO 2021/060010 A1 | 4/2021 |

* cited by examiner

NONAQUEOUS ELECTROLYTE SECONDARY BATTERY

CROSS REFERENCE TO RELATED APPLICATIONS

The present application claims priority from Japanese Patent Application 2021-193248 filed on Nov. 29, 2021, which is incorporated by reference herein in its entirety.

BACKGROUND

The present disclosure relates to a nonaqueous electrolyte secondary battery.

A battery, such as a lithium ion secondary battery, generally includes an electrode assembly in which a negative electrode and a positive electrode are laminated via a separator. As one example of a configuration of the electrode assembly, a configuration is known that positive electrode tabs and negative electrode tabs for a collector are provided on the electrode assembly, and that these tabs and an electrical collector member are electrically connected. For example, International Patent Publication 2021-060010 discloses a configuration in which positive electrode tabs are provided at one end part of an electrode assembly and negative electrode tabs are provided at the other end part.

SUMMARY

Anyway, for a manufacture of a battery, it is desired to shorten time during which liquid injection of an electrolyte into the electrode assembly is performed. For example, if a density of active material layer contained in an electrode is made to be higher in order to implement higher capacity, the electrolyte is made to hardly permeate into the electrode assembly, so as to deteriorate the liquid injection property.

In addition, when a capacity of the positive electrode and a capacity of the negative electrode are compared and then the capacity of the negative electrode is not sufficient, there are some fears that charge carriers (e.g., lithium ions) precipitate so as to deteriorate the battery performance. This kind of precipitation can be also caused by losing balance of the capacity ratio (opposed capacity ratio) with respect to the opposed negative electrode and positive electrode in a predetermined area. Thus, it is desirable in any area to have the balance of the opposed capacity ratio being adjusted in order to avoid making the capacity of the negative electrode be lower than the capacity of the opposed positive electrode.

Therefore, the present disclosure has been made in view of the above-described circumstances, and a main object is to provide a nonaqueous electrolyte secondary battery in which the balance of the capacity ratio with respect to the opposed positive electrode and negative electrode is good and the liquid injection property is enhanced.

The present disclosure provides a nonaqueous electrolyte secondary battery including an electrode assembly in which a positive electrode, a negative electrode, and a separator that is arranged between the positive electrode and the negative electrode are provided. In the herein disclosed nonaqueous electrolyte secondary battery, the positive electrode includes a positive electrode substrate and positive electrode active material layers formed on both surfaces of the positive electrode substrate. The negative electrode includes a negative electrode substrate and negative electrode active material layers formed on both surfaces of the negative electrode substrate. At one end side of the negative electrode in a width direction, negative electrode tabs are provided that are configured with a part of the negative electrode substrate and protrude from the end side. The negative electrode active material layer includes a first area between the end side and a position 5 mm away from the end side in the width direction of the negative electrode. An end part of the positive electrode is opposed to at least a part of the first area via the separator. A relation of a thickness $T1$ of the positive electrode active material layer at a central part of the positive electrode and a thickness $T2$ of the positive electrode active material layer at an end part of the positive electrode satisfies $0.95 < T2/T1 < 1.05$. A basis weight (mass of the negative electrode active material layer per unit area) $M1$ of the negative electrode active material layer at a central part of the negative electrode and a basis weight (mass of the negative electrode active material layer per unit area) $M2$ of the negative electrode active material layer at an area opposed to the positive electrode active material layer on the first area satisfy a following condition: $0.95 < M2/M1 < 1$.

According to the configuration as described above, the basis weight $M2$ of the negative electrode active material layer at the area opposed to the positive electrode active material layer on the first area is smaller than the basis weight $M1$ of the negative electrode active material layer at the central part of the negative electrode, Thus, it is facilitated to make the nonaqueous electrolyte permeate from the first area side to the inside of the electrode assembly, and thus the liquid injection property is enhanced. In addition, by making the basis weight $M2$ of the negative electrode active material layer at the area opposed to the positive electrode active material layer on the first area satisfy the above described condition, it is possible even on the area as described above to sufficiently store the charge carriers (for example, lithium ions) coming from the positive electrode active material layer opposed to the negative electrode active material layer (in other words, the balance of the capacity ratio is good), and thus it is possible to suppress the precipitation of the charge carriers.

Regarding one aspect of the herein disclosed nonaqueous electrolyte secondary battery, on the first area, the negative electrode active material layer is formed to have a thickness of the negative electrode active material layer being gradually smaller toward the end side. By doing this, the inclined part is formed on the first area, and thus a gap is generated between the negative electrode active material layer and the separator so as to further enhance the liquid injection property.

Regarding one aspect of the herein disclosed nonaqueous electrolyte secondary battery, the positive electrode might include positive electrode tabs configured with a part of the positive electrode substrate. The electrode assembly might include a plurality of the negative electrode tabs at one end part, and include a plurality of the positive electrode tabs at another end part.

Regarding one aspect of the herein disclosed nonaqueous electrolyte secondary battery, the electrode assembly might be a wound electrode assembly in which the positive electrode formed in a strip-like shape and the negative electrode formed in a strip-like shape are wound via the separator formed in a strip-like shape. In addition, regarding one aspect of the herein disclosed nonaqueous electrolyte secondary battery, a width of the negative electrode active material layer in a wound axis direction of the wound electrode assembly might be equal to or more than 20 cm.

One aspect of the herein disclosed nonaqueous electrolyte secondary battery might further include a negative electrode tabs group configured with plural ones of the negative electrode tabs being laminated, and a negative electrode collecting member electrically connected to the negative electrode tabs, and the negative electrode tabs group might be folded and bent so as to be connected to the negative electrode collecting member.

Regarding one aspect of the herein disclosed nonaqueous electrolyte secondary battery, both surfaces of the separator are provided with adhesion layers. If a separator including the adhesion layer is used, the shift of the electrode plate at the electrode assembly manufacturing time can be suppressed, but the liquid injection property is deteriorated in contrast. However, according to the herein disclosed configuration of the nonaqueous electrolyte secondary battery, the basis weight at the vicinity of the end part of the negative electrode active material layer (the first area) is relatively smaller, and thus, the adhesion of the adhesion layer to the negative electrode active material layer becomes weak at the vicinity of the end part. Particularly, when the inclined part is formed at the end part of the negative electrode active material layer, it becomes harder to make the adhesion layer adhere to the inclined part, then the adhesion becomes weaker or does not work, it becomes easy to make the nonaqueous electrolyte invade into the negative electrode active material layer, and therefore, it is possible to enhance the liquid injection property.

Regarding one aspect of the herein disclosed nonaqueous electrolyte secondary battery, the negative electrode active material layer might protrude from an end part of the separator in a protruding direction of the negative electrode tabs and might be formed on the negative electrode tabs.

Regarding one aspect of the herein disclosed nonaqueous electrolyte secondary battery; the first area might be configured to include an area not opposed to the positive electrode active material layer, and in a width direction of the negative electrode, a width W2 of the area opposed to the positive electrode on the first area might be configured to become larger than a width W3 of the area not opposed to the positive electrode on the first area.

DETAILED DESCRIPTION

Below, while referring to drawings, some of preferred embodiments for a herein disclosed technique will be explained. Incidentally, the matters other than matters particularly mentioned in this specification and required for practicing the present technique (for example, a general configuration and manufacturing process for the battery by which the present technique is not restricted) can be grasped as design matters of those skilled in the art based on the related art in the present field. The present technique can be executed based on the contents disclosed in the present specification, and the technical common sense in the present field.

Incidentally, in the present specification, the wording "nonaqueous electrolyte secondary battery" is a term widely denoting an electric storage device that uses a nonaqueous electrolyte as a charge carrier and that is capable of repeatedly charging and discharging in response to movement of the charge carrier between positive and negative electrodes, and is a concept containing so called storage batteries (chemical batteries), such as a lithium ion secondary battery and a nickel hydrogen battery, and containing capacitors (physical batteries), such as an electric double layer capacitor.

Figure 1:
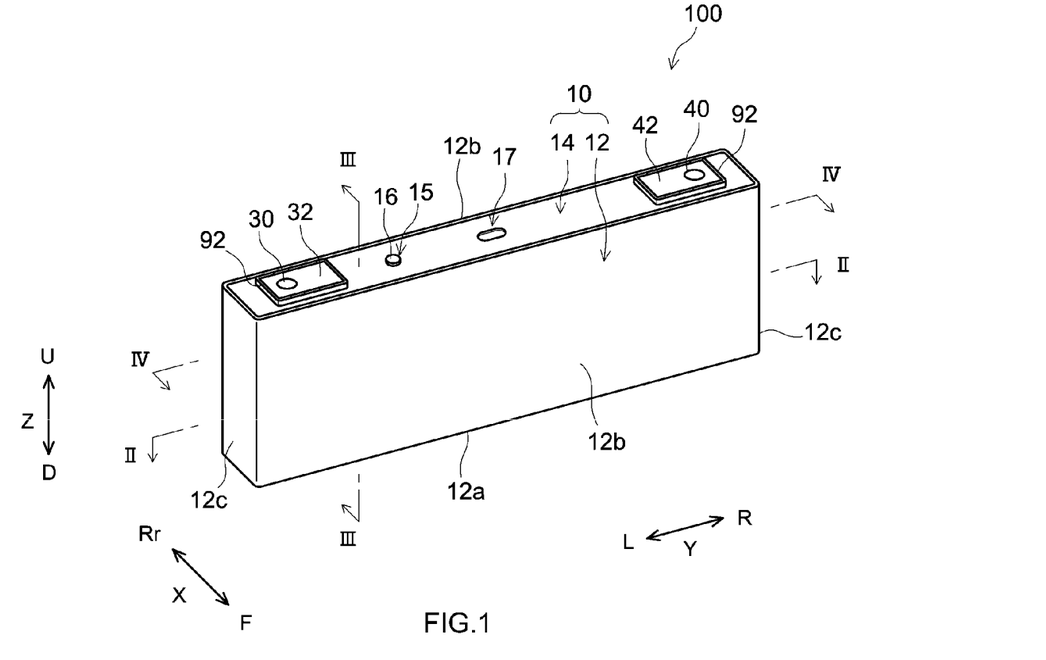
FIG. 1 is a perspective view that schematically shows a nonaqueous electrolyte secondary battery in accordance with one embodiment.
Figure 2:
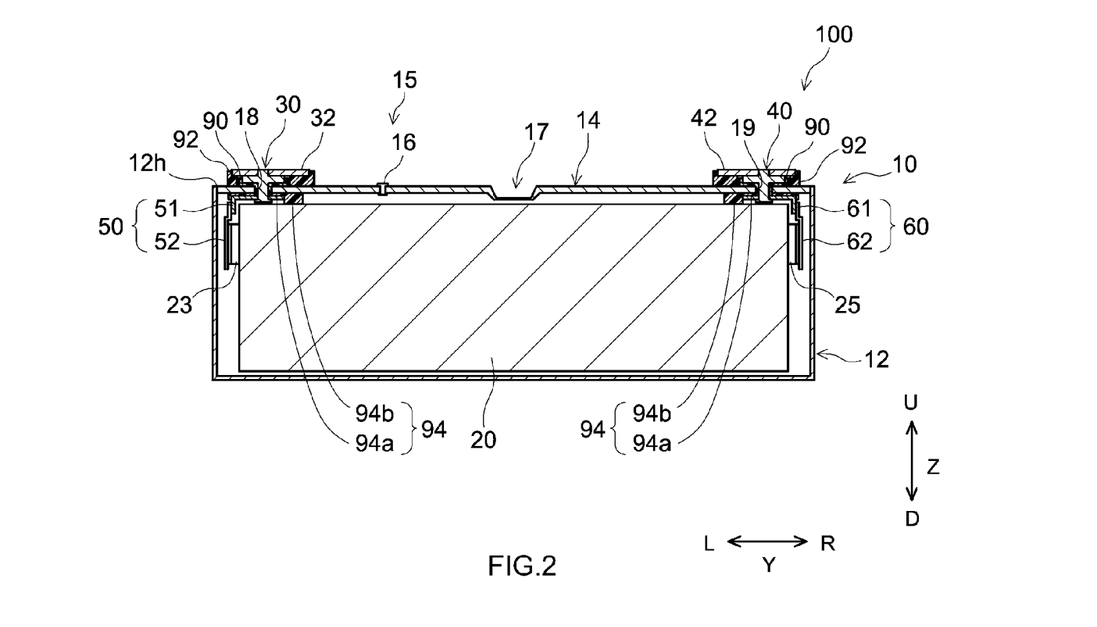
FIG. 2 is a longitudinal cross section view that is schematically shown along a II-II line of FIG. 1.
Figure 3:
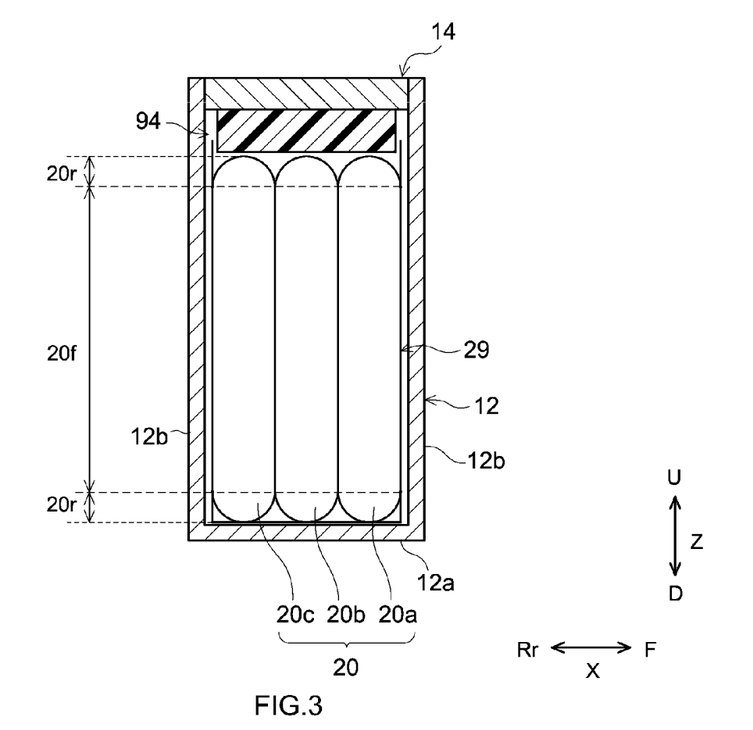
FIG. 3 is a longitudinal cross section view that is schematically shown along a line of FIG. 1.
Figure 4:
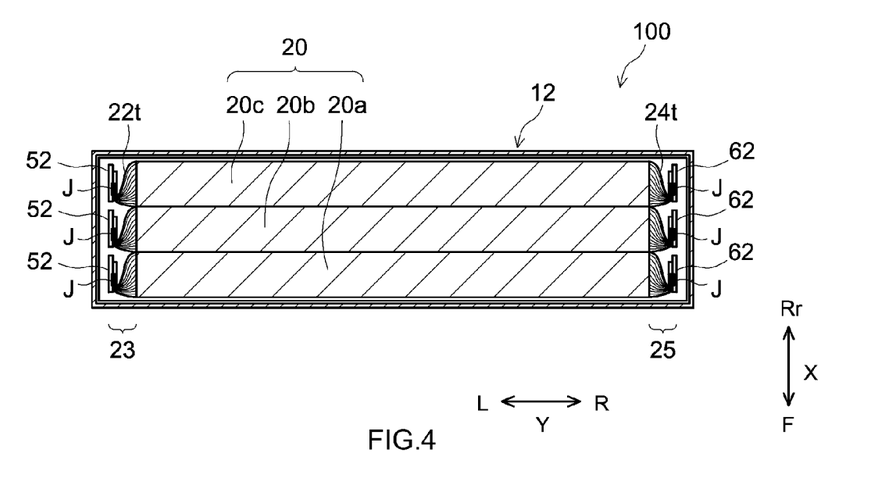
FIG. 4 is a lateral cross section view that is schematically shown along a IV-IV line of FIG. 1.

FIG. 1 is a perspective view of a nonaqueous electrolyte secondary battery 100. FIG. 2 is a longitudinal cross section view that is schematically shown along a II-II line of FIG. 1. FIG. 3 is a longitudinal cross section view that is schematically shown along a III-III line of FIG. 1. FIG. 4 is a lateral cross section view that is schematically shown along a IV-IV line of FIG. 1. Incidentally, in the explanation described below, reference signs L, R, Rr, U, and D in drawings respectively represent left, right, front, rear, up, and down, and reference signs X, Y, and Z in drawings respectively represent a short side direction, a long side direction orthogonal to the short side direction, and a vertical direction of the nonaqueous electrolyte secondary battery 100. The long side direction Y is an example of a first direction disclosed herein, and the short side direction is an example of the second direction disclosed herein. However, these are merely directions for the convenience sake of explanation, which never restrict the disposed form of the nonaqueous electrolyte secondary battery 100.

As shown in FIG. 2, the nonaqueous electrolyte secondary battery 100 includes a battery case 10, an electrode assembly group 20, a positive electrode terminal 30, a negative electrode terminal 40, a positive electrode collecting member 50, and a negative electrode collecting member 60. As the illustration is omitted, here, the nonaqueous electrolyte secondary battery 100 further includes a nonaqueous electrolyte solution. The nonaqueous electrolyte secondary battery 100 here is a lithium ion secondary battery.

The battery case 10 is a housing that is configured to accommodate the electrode assembly group 20. The battery case 10 here has an outer appearance that is formed in a flat and bottomed rectangular parallelopiped shape (square shape). A material of the battery case 10 might be the same as a material conventionally used, and is not particularly restricted. It is preferable that the battery case 10 is made of metal, and it is more preferable that, for example, the battery case is made of aluminum, aluminum alloy; iron, iron alloy, or the like. As shown in FIG. 2, the battery case 10 includes an outer package 12 having an opening 12h, and includes a sealing plate (lid body) 14 configured to cover the opening 12h.

As shown in FIG. 1, the outer package 12 includes a bottom wall 12a, a pair of longer side walls 12b that extend from the bottom wall 12a and are opposed mutually, and a pair of shorter side walls 12c that extend from the bottom wall 12a and are opposed mutually. The bottom wall 12a is formed in an approximately rectangular shape. The bottom wall 12a is opposed to the opening 12h. An area of the shorter side wall 12c is smaller than an area of the longer side wall 12b. The longer side wall 12b and the shorter side wall 12c are respectively an example of the herein disclosed first side wall and an example of the herein disclosed second side wall. The sealing plate 14 is attached to the outer package 12 to cover the opening 12h of the outer package 12. The sealing plate 14 is opposed to the bottom wall 12a of the outer package 12. The sealing plate 14 is approximately rectangular in a plane view. The battery case 10 is integrated by joining (for example, welding and joining) the sealing plate 14 to a peripheral edge of the opening 12h of the outer package 12. The battery case 10 is airtightly sealed (closed).

As shown in FIG. 2, the sealing plate 14 is provided with a liquid injection hole 15, a gas exhaust valve 17, and two terminal insertion holes 18, 19. The liquid injection hole 15 is for performing liquid injection of the electrolyte after the sealing plate 14 is assembled to the outer package 12. The liquid injection hole 15 is sealed by a sealing member 16. The gas exhaust valve 17 is configured to be broken when a pressure inside the battery case 10 becomes equal to or more than a predetermined value, so as to exhaust the gas inside the battery case 10 to the outside. The terminal insertion holes 18, 19 are respectively formed at both ends of the sealing plate 14 in a long side direction Y. The terminal insertion holes 18, 19 penetrate the sealing plate 14 in a vertical direction Z. The terminal insertion holes 18, 19 respectively have inner diameters capable of inserting the positive electrode terminal 30 and the negative electrode terminal 40 before being attached to the sealing plate 14 (before swaging process).

The positive electrode terminal 30 and the negative electrode terminal 40 both are fixed to the sealing plate 14. The positive electrode terminal 30 is arranged at one side (left side in FIG. 1 and FIG. 2) of the sealing plate 14 in the long side direction Y. The negative electrode terminal 40 is arranged at the other side (right side in FIG. 1 and FIG. 2) of the sealing plate 14 in the long side direction Y. As shown in FIG. 1, the positive electrode terminal 30 and the negative electrode terminal 40 are exposed on an outside surface of the sealing plate 14, As shown in FIG. 2, the positive electrode terminal 30 and the negative electrode terminal 40 are respectively inserted into the terminal insertion holes 18, 19 so as to extend from the inside to the outside of the sealing plate 14. The positive electrode terminal 30 and the negative electrode terminal 40 here are swaged by a swaging process at peripheral edge portions surrounding the terminal insertion holes 18, 19 of the sealing plate 14. Swaged parts are formed on end parts of the positive electrode terminal 30 and the negative electrode terminal 40 at the outer package 12 side.

As shown in FIG. 2, the positive electrode terminal 30 is electrically connected to the positive electrode of the electrode assembly group 20, inside the outer package 12, via the positive electrode collecting member 50. The negative electrode terminal 40 is electrically connected to the negative electrode of the electrode assembly group 20, inside the outer package 12, via the negative electrode collecting member 60. The positive electrode terminal 30 and the negative electrode terminal 40 are examples of herein disclosed terminals.

It is preferable that the positive electrode terminal 30 is made of metal, and it is more preferable that the positive electrode terminal is made of, for example, aluminum or aluminum alloy. It is preferable that the negative electrode terminal 40 is made of metal, and it is more preferable that the negative electrode terminal is made of, for example, copper or copper alloy. The negative electrode terminal 40 might be configured by joining two conductive members to be integrated. For example, a portion connected to the negative electrode collecting member 60 might be made of copper or copper alloy, and a portion exposed on the outside surface of the sealing plate 14 might be made of aluminum or aluminum alloy.

As shown in FIG. 1, a plate-shaped positive electrode outside conductive member 32 and negative electrode outside conductive member 42 are attached to the outside surface of the sealing plate 14. The positive electrode outside conductive member 32 is electrically connected to the positive electrode terminal 30. The negative electrode outside conductive member 42 is electrically connected to the negative electrode terminal 40. The positive electrode outside conductive member 32 and the negative electrode outside conductive member 42 are members on which a bus bar is disposed, when plural nonaqueous electrolyte secondary batteries 100 are electrically connected to each other. It is preferable that the positive electrode outside conductive member 32 and the negative electrode outside conductive member 42 are made of metal, and it is more preferable that the positive electrode outside conductive member and the negative electrode outside conductive member are made of, for example, aluminum or aluminum alloy. The positive electrode outside conductive member 32 and the negative electrode outside conductive member 42 are insulated from the sealing plate 14 by an outside insulating member 92. However, the positive electrode outside conductive member 32 and the negative electrode outside conductive member 42 are not essential, and might be omitted in another embodiment.

Figure 5:
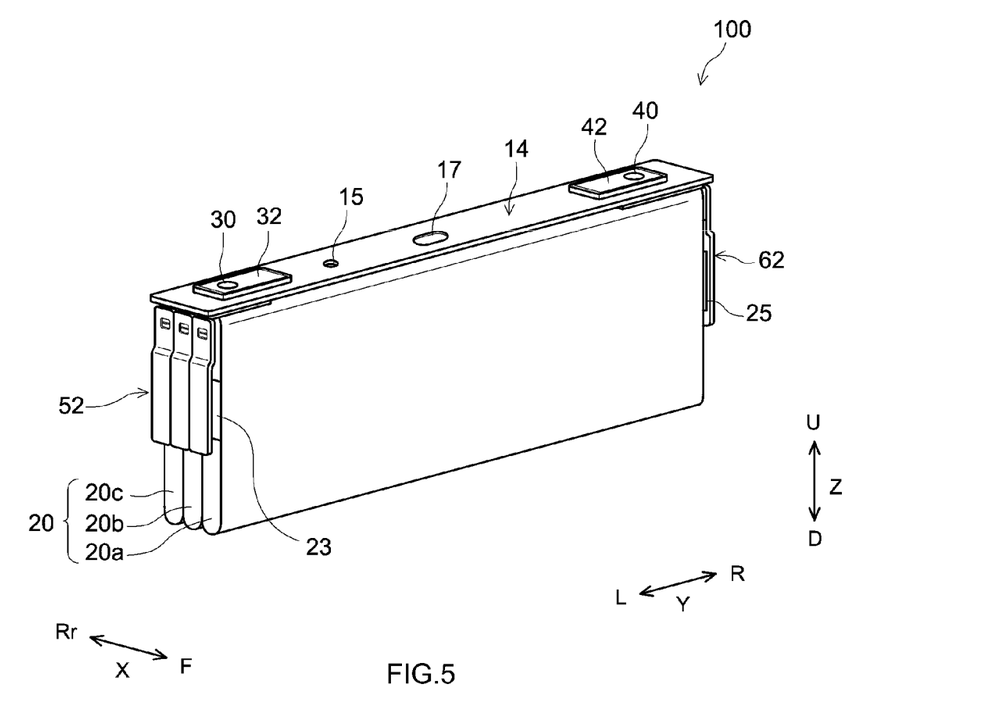
FIG. 5 is a perspective view that schematically shows an electrode assembly group attached to a sealing plate.
Figure 6:
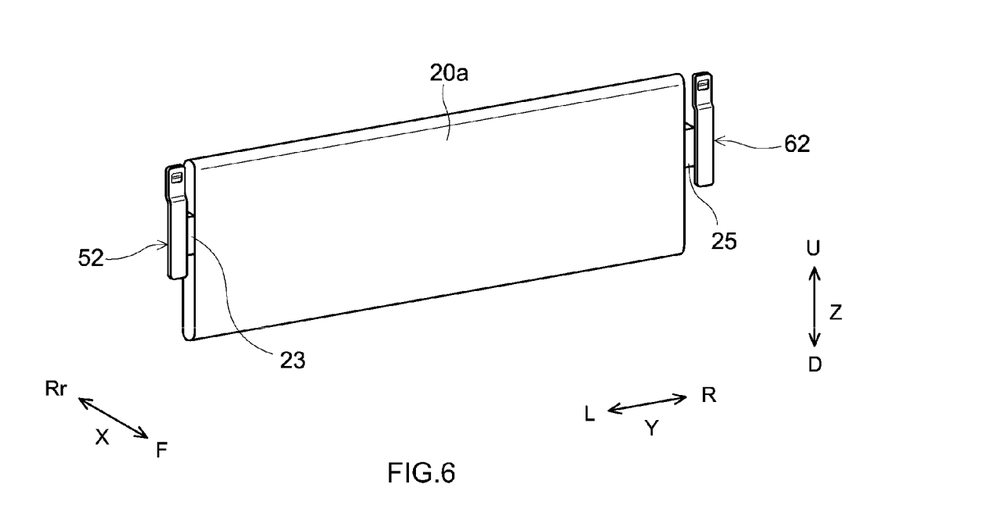
FIG. 6 is a perspective view that schematically shows an electrode assembly to which a positive electrode second electrical collector part and a negative electrode second electrical collector part are attached.

FIG. 5 is a perspective view that schematically shows the electrode assembly group 20 attached to the sealing plate 14. FIG. 6 is a perspective view that schematically shows the electrode assembly 20a. In the nonaqueous electrolyte secondary battery 100 according to the present embodiment, the electrode assembly group 20 internally including plural electrode assemblies 20a, 20b, 20c is accommodated in the battery case 10. However, the number of the electrode assemblies arranged inside one outer package 12 is not particularly restricted, might be 2 or more (plural), or might be one. Although the detailed structure be described later, each of the electrode assemblies 20a, 20b, 20c includes a positive electrode tab group 23 configured with plural positive electrode tabs 22t and includes a negative electrode tab group 25 configured with plural negative electrode tabs 24t. The positive electrode collecting member 50 configures a conduction path that electrically connects the positive electrode tab group 23 and the positive electrode terminal 30. In addition, the negative electrode collecting member 60 configures a conduction path that electrically connects the negative electrode tab group 25 and the negative electrode terminal 40. Here, the positive electrode tab group 23 is disposed at one end part of the electrode assembly 20a and the negative electrode tab group 25 is disposed at the other end part.

As shown in FIGS. 2, 5, and 6, the positive electrode collecting member 50 includes a positive electrode first electrical collector part 51 that is a plate-shaped conductive member extending along an inside surface of the sealing plate 14 and includes a positive electrode second electrical collector part 52 that is a plate-shaped conductive member extending along the vertical direction Z. A lower end part of the positive electrode terminal 30 passes through a terminal insertion hole 18 of the sealing plate 14 so as to extend toward an inside of the battery case 10, and is connected to the positive electrode first electrical collector part 51. On the other hand, as shown in FIGS. 2 and 4 to 6, the positive electrode second electrical collector part 52 has one end connected to the positive electrode first electrical collector part 51 and the other end connected to the positive electrode tab group 23 of the electrode assembly group 20, so that a connecting part J is formed. Here, the positive electrode tab group 23 of the electrode assembly group 20 is folded and bent to make the positive electrode second electrical collector part 52 and the side surface including the positive electrode tab group 23 of the electrode assemblies 20a, 20b, 20c be opposed to each other. By doing this, it is possible to make a width of the positive electrode tab group 23 in the long side direction Y be smaller. As the result, it is possible to increase a coating width for the positive electrode active material layer 22a and negative electrode active material layer 24a included by the later described electrode assembly group 20 in the long side direction Y, and thus it is possible to implement making the nonaqueous electrolyte secondary battery 100 have higher capacity. Incidentally, it is preferable that the positive electrode first electrical collector part 51 and the positive electrode second electrical collector part 52 are made of metal, and they can be configured, for example, with aluminum, aluminum alloy, nickel, stainless steel, or the like.

As shown in FIGS. 2, 5, and 6, the negative electrode collecting member 60 includes a negative electrode first electrical collector part 61 that is a plate-shaped conductive member extending along an inside surface of the sealing plate 14, and includes a negative electrode second electrical collector part 62 that is a plate-shaped conductive member extending along the vertical direction Z. A lower end part of the negative electrode terminal 40 passes through the terminal insertion hole 18 of the sealing plate 14 so as to extend toward an inside of the battery case 10, and is connected to the negative electrode first electrical collector part 61. On the other hand, as shown in FIGS. 2 and 4 to 6, the negative electrode second electrical collector part 62 has one end connected to the negative electrode first electrical collector part 61 and the other end connected to the negative electrode tab group 25 of the electrode assembly group 20, so that the connecting part J is formed. Here, the negative electrode tab group 25 of the electrode assembly group 20 is folded and bent to make the negative electrode second electrical collector part 62 and the side surface including the negative electrode tab group 25 of the electrode assemblies 20a, 20b, 20c be opposed to each other. By doing this, it is possible to implement the nonaqueous electrolyte secondary battery 100 having higher capacity, similarly to the above-described configuration that the positive electrode tab group 23 is folded and bent. Incidentally, it is preferable that the negative electrode first electrical collector part 61 and the negative electrode second electrical collector part 62 are made of metal, and they can be configured, for example, with copper, copper alloy, nickel, stainless steel, or the like.

In the nonaqueous electrolyte secondary battery 100 according to the present embodiment, various insulating members are attached to inhibit the conduction between the battery case 10 and the electrode assembly group 20. In particular, an outside insulating member 92 is disposed between the positive electrode outside conductive member 32 (or negative electrode outside conductive member 42) and an outside surface of the sealing plate 14 (see FIG. 1). By doing this, it is possible to inhibit the positive electrode outside conductive member 32 or the negative electrode outside conductive member 42 from conducting with the sealing plate 14. In addition, a gasket 90 is attached to each of the terminal insertion holes 18, 19 of the sealing plate 14 (see FIG. 2). By doing this, it is possible to inhibit the positive electrode terminal 30 (or negative electrode terminal 40) inserted into the terminal insertion hole 18, 19 from conducting with the sealing plate 14. In addition, an inside insulating member 94 is arranged between the positive electrode first electrical collector part 51 (or negative electrode first electrical collector part 61) and an inside surface of the sealing plate 14. This inside insulating member 94 includes a plate-shaped base part 94a disposed between the positive electrode first electrical collector part 51 (or negative electrode first electrical collector part 61) and the inside surface of the sealing plate 14. By doing this, it is possible to inhibit the positive electrode first electrical collector part 51 or the negative electrode first electrical collector part 61 from conducting with the sealing plate 14. Furthermore, the inside insulating member 94 includes a protruding part 94b that protrudes from the inside surface of the sealing plate 14 to the electrode assembly group 20 (see FIG. 2 and FIG. 3). By doing this, it is possible to regulate movement of the electrode assembly group 20 in the vertical direction Z and to inhibit the electrode assembly group 20 and the sealing plate 14 directly from coming into contact to each other. In addition, the electrode assembly group 20 is accommodated inside the battery case 10 in a state of being covered by an electrode assembly holder 29 consisting of a resin sheet having an insulating property (see FIG. 3). By doing this, it is possible to inhibit the electrode assembly group 20 and the outer package 12 from directly coming into contact to each other. Incidentally, a material of each insulating member described above is not particularly restricted, if having a predetermined insulating property. As an example, it is possible to use a synthetic resin material, such as polyolefin type resin (example: polypropylene (PP), polyethylene (PE)), fluorine type resin (example: perfluoro alkoxy alkane (PFA), polytetrafluoroethylene (PTFE)), or the like.

The nonaqueous electrolyte might be the same as conventional one, and is not particularly restricted. The nonaqueous electrolyte contains, for example, a nonaqueous type solvent and a supporting salt. The nonaqueous type solvent contains, for example, carbonates, such as ethylene carbonate, dimethyl carbonate, and ethyl methyl carbonate. The supporting salt is, for example, a fluorine-containing lithium salt, such as $LiPF_6$. However, the nonaqueous electrolyte might be formed in a solid shape (solid electrolyte) and might be integrated with the electrode assembly group 20.

Figure 7:
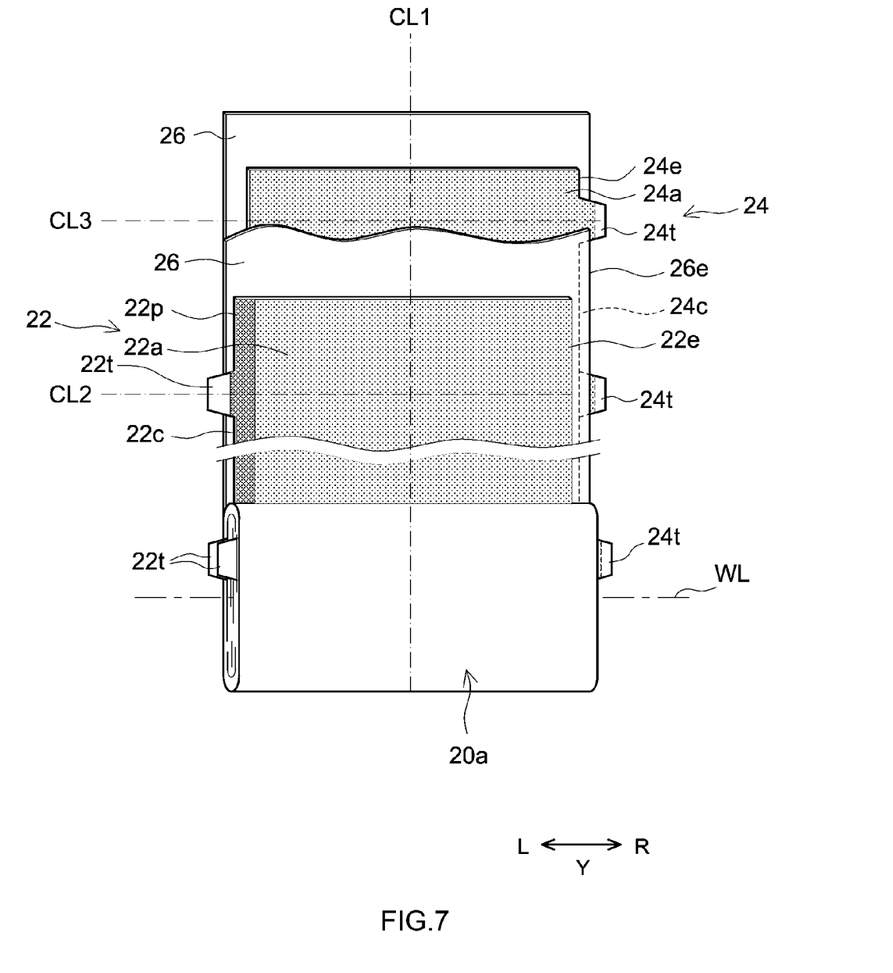
FIG. 7 is a schematic view that shows a configuration of the electrode assembly.
Figure 8:
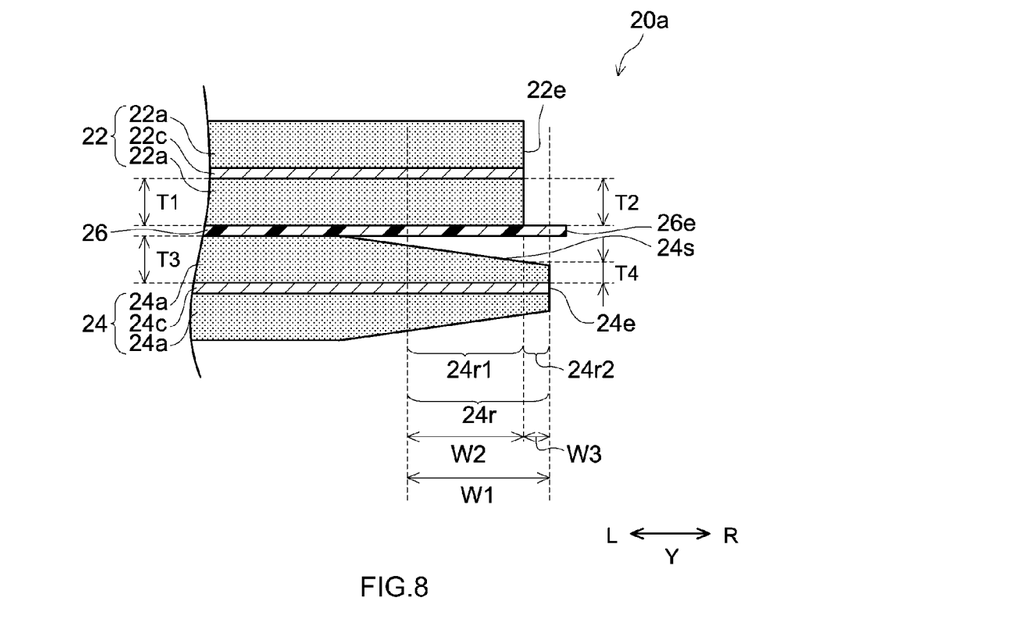
FIG. 8 is a cross section view that shows a structure at a vicinity of an end side including negative electrode tabs of the negative electrode of the electrode assembly in accordance with one embodiment.

FIG. 7 is a schematic view that shows a configuration of the electrode assembly 20a. In addition, FIG. 8 is a cross section view that shows a structure at a vicinity of an end side 24e including a negative electrode tabs 24t of the negative electrode 24 in the electrode assembly 20a according to one embodiment. Incidentally, although details will be explained below with the electrode body 20a used as an example, a similar configuration can be applied to the electrode bodies 20b, 20c. As shown in FIG. 7, the electrode assembly 20a includes a positive electrode 22 and a negative electrode 24. The electrode assembly 20a here is a flat-shaped wound electrode assembly in which the positive electrode 22 formed and disposed in a strip-like shape and the negative electrode 24 formed and disposed in a strip-like shape are laminated via a separator 26 formed in a strip-like shape so as to be wound about a wound axis WL treated as the center. The positive electrode 22 and negative electrode 24 are examples of the herein disclosed first electrode and second electrode.

The electrode assembly 20a is arranged inside the outer package 12 to make the wound axis WL be in parallel to the long side direction Y. In other words, the electrode assembly 20a is arranged inside the outer package 12 with the wound axis WL being in parallel to the bottom wall 12a and being in a direction orthogonal to the shorter side wall 12c. An end surface of the electrode assembly 20a (in other words, laminate surface on which the positive electrode 22, the negative electrode 24, and the separator 26 are laminated, or an end surface in the long side direction Y of FIG. 7) is opposed to the shorter side wall 12c.

As shown in FIG. 3, the electrode assembly 20a includes a pair of bent parts 20r that are opposed to a bottom wall 12a of the outer package 12 and the sealing plate 14, and includes a flat part 20f that is coupled to the pair of bent parts 20r and is opposed to the longer side wall 12b of the outer package 12. However, the electrode assembly 20a might be a laminate electrode body in which plural square shaped (typically, rectangular) positive electrodes and plural square shaped (typically, rectangular) negative electrodes are stacked in a state of being insulated.

The separator 26 is a member that insulates the positive electrode active material layer 22a of the positive electrode 22 and the negative electrode active material layer 24a of the negative electrode 24. As the separator 26, for example, a porous resin sheet is suitable that consists of a polyolefin type resin, such as polyethylene (PE) and polypropylene (PP). In addition, the separator 26 might be provided on a surface of the resin sheet with a heat resistance layer (HRL) containing an inorganic filler. As the inorganic filler, for example, it is possible to use alumina, boehmite, water oxidation aluminum, titania, or the like. In addition, it is preferable that an adhesion layer is provided on a surface of one side or surfaces of bath sides of the separator 26. The adhesion layer enhances a adhesive property with respect to the positive electrode active material layer or negative electrode active material layer to be brought into contact. Tice adhesion layer contains, for example, polyvinylidene fluoride (PVdF) as an adhesion component. In addition, the adhesion layer can contain an inorganic particle, such as alumina and boehmite. The adhesion layer might be provided on a surface of the resin sheet, or might be provided on a surface of the HRL.

As shown in FIG. 7, the positive electrode 22 includes a positive electrode substrate 22c, and includes a positive electrode active material layer 22a and a positive electrode protective layer 22p that are formed at least one surface of the positive electrode substrate 22c (here, both surfaces). However, the positive electrode protective layer 22p is not essential, and might be omitted in another embodiment. The positive electrode substrate 22c is formed in a strip-like shape. The positive electrode substrate 22c consists, for example, of an electrically conductive metal, such as aluminum, aluminum alloy, nickel, and stainless steel. The positive electrode substrate 22c here is a metal foil, in particular, an aluminum foil.

Plural positive electrode tabs 22t are provided on one end side (left end part in FIG. 7) in a width direction of the positive electrode substrate 22c (long side direction Y in the drawing, in other words, direction orthogonal to the longitudinal direction on the surface of the positive electrode substrate 22c). Each of the plural positive electrode tabs 22t protrudes toward one side in the width direction (left side in FIG. 7), The plural positive electrode tabs 22t protrude in the long side direction Y more than the separator 26. The plural positive electrode tabs 22t are provided at intervals (intermittently) along a longitudinal direction of the positive electrode 22. Each of the plural positive electrode tabs 22t is formed in a trapezoidal shape. The positive electrode tabs 22t here are a part of the positive electrode substrate 22c and consist of metal foils (here, aluminum foils). The positive electrode tabs 22t include portions (core body exposed parts) on which the positive electrode active material layer 22a and positive electrode protective layer 22p of the positive electrode substrate 22c are failed to be formed. However, the positive electrode tabs 22t might be a member different from the positive electrode substrate 22c. In addition, the positive electrode tabs 22t might be provided at the other end part (right end part in FIG. 7) in the width direction, or might be provided at both ends in the width direction.

As shown in FIG. 4, the plural positive electrode tabs 22t are laminated at one end part (left end part in FIG. 4) in the width direction (long side direction Y), and sizes (length in the long side direction Y and width orthogonal to the long side direction Y, see FIG. 7) of the plural positive electrode tabs 22t configuring the positive electrode tab group 23 can be suitably adjusted in consideration of a state of being connected to the positive electrode collecting member 50, for example, on the basis of the formed position, or the like. Sizes of the plural positive electrode tabs 22t are mutually different to align the outer side ends when the plural positive electrode tabs are bent. The positive electrode tab group 23 is an example of the herein disclosed electrode tab group.

As shown in FIG. 7, the positive electrode active material layer 22a is provided in a strip-like shape along a longitudinal direction of the positive electrode substrate 22c formed in a strip-like shape. The positive electrode active material layer 22a contains a positive electrode active substance that can reversibly store and release a charge carrier. it is preferable that the positive electrode active substance contains at least one kind among at least Ni, Co, and Mn, and as the positive electrode active substance, for example, a lithium transition metal composite oxide, such as lithium-nickel-cobalt-manganese composite oxide, can be used. When a total solid content of the positive electrode active material layer 22a is treated as 100 mass %, the positive electrode active substance might occupy approximately 80 mass % or more, typically 90 mass % or more, or, for example, 95 mass % or more. The positive electrode active material layer 22a might contain an arbitrary component other than the positive electrode active substance, for example, an electrical conducting material, a binder, various additive components, or the like. As the electrical conducting material, for example, a carbon material, such as carbon black (e.g., acetylene black (AB)) can be used. As the binder, for example, PVdF or the like can be used.

As shown in FIG. 7, the positive electrode protective layer 22p is provided at a boundary portion between the positive electrode substrate 22c and the positive electrode active material layer 22a in the width direction (long side direction Y). The positive electrode protective layer 22p here is provided at one end part (left end part in FIG. 7) of the positive electrode substrate 22c in the width direction (long side direction Y). The positive electrode protective layer 22p is provided in a strip-like shape along the positive electrode active material layer 22a. The positive electrode protective layer 22p contains an inorganic filler (for example, alumina). When a total solid content of the positive electrode protective layer 22p is treated as 100 mass %, the inorganic filler might occupy approximately 50 mass % or more, typically 70 mass % or more, or, for example, 80 mass % or more. The positive electrode protective layer 22p might contain an arbitrary component other than the inorganic filler, for example, an electrical conducting material, a binder, various additive components, or the like. The electrical conducting material and the binder might be the same as ones that are illustrated as components capable of being contained in the positive electrode active material layer 22a.

Regarding the positive electrode 22, when a thickness of the positive electrode active material layer 22a at the central part of the positive electrode 22 in the width direction (long side direction Y) is represented by T1 and a thickness of the positive electrode active material layer 22a at the end part 22e (right end part in FIGS. 7 and 8) opposed to the first area 24r of the later described negative electrode active material layer 24a is represented by T2, it is configured to have a ratio (T2/T1) of the thicknesses satisfying 0.95<T2/T1<1.05, or preferably configured to have the ratio satisfying 0.97<T2/T1<1.03. In other words, the thickness of the positive electrode active material layer 22a is configured to make a thickness of a portion, from the central part to the end part opposed to the first area 24r of the later described negative electrode active material layer 24a, be substantially not changed. Incidentally, in FIG. 8, it is formed to make the thickness of the positive electrode active material layer 22a at the central part of the positive electrode 22 and the thickness (in other words, thickness T1) of the positive electrode active material layer 22a at the left end part in FIG. 8 be the same.

Incidentally, in the present specification, as shown in FIG. 7, the central part of the positive electrode 22 means a square area whose one side is 2 cm and whose center is an intersection point with a straight line CL1 passing through the center of the electrode assembly 20a in the width direction (long side direction Y) and extending in the longitudinal direction and with a straight line CL2 passing through the center of a width extending in the longitudinal direction of the positive electrode tabs 22t and extending in the protruding direction (long side direction Y) of the positive electrode tabs 22t. Thus, the thickness T1 of the positive electrode active material layer 22a at the central part of the positive electrode 22 means an average thickness of the positive electrode active material layer 22a on the area described above. In addition, the thickness T2 of the positive electrode active material layer 22a means an average thickness on a rectangle range whose short side is a length in the width direction (long side direction Y) opposed to the first area 24r of the negative electrode active material layer 24a and whose long side is a length of 2 cm in the longitudinal direction with the straight line CL2 treated as the center.

A basis weight (mass of the positive electrode active material layer 22a per unit area) of the positive electrode active material layer 22a is, from a perspective of implementing a higher capacity, fir example, appropriately equal to or more than 300 g/m², or preferably equal to or more than 400 g/m². In addition, from a perspective of decreasing the thickness of the electrode assembly 20a, the basis weight described above is, for example, appropriately equal to or less than 700 g/m² or preferably equal to or less than 600 g/m². In addition, a basis weight m1 of the positive electrode active material layer 22a at the central part of the positive electrode 22 is preferably similar to a basis weight m2 of the positive electrode active material layer 22a at the end part 22e of the positive electrode 22, for example, appropriately 0.95<m2/m1<1.05, or preferably 0.97<m2/m1<1.03. Incidentally; a measured area of the basis weight m1 is an area the same as the thickness T1, and a measured area of the basis weight m2 is an area the same as the thickness T2.

A length of the positive electrode active material layer 22a in the width direction (wound axis WL direction) is not particularly restricted, but, for example, can be equal to or more than 20 cm, or can be equal to or more than 25 cm. By doing this, it is possible to make the nonaqueous electrolyte secondary battery 100 have the higher capacity. In addition, from a perspective of solving the uneven reaction of the electrode assembly 20a, the length of the positive electrode active material layer 22a in the width direction can be, for example, equal to or less than 50 cm, or equal to or less than 40 cm.

A surface roughness (Ra) of a surface of the positive electrode active material layer 22a coming into contact with the separator 26 can be, for example, 0.2 µm to 0.6 µm, Incidentally, in the present specification, "surface roughness" means an arithmetic average roughness based on JIS_B_0601:2001.

As shown in FIG. 7, the negative electrode 24 includes a negative electrode substrate 24c, and a negative electrode active material layer 24a formed on at least one surface (here, both surfaces) of the negative electrode substrate 24c. The negative electrode substrate 24c is formed in a strip-like shape. The negative electrode substrate 24c consists of, for example, an electrically conductive metal, such as copper, copper alloy, nickel, and stainless steel. The negative electrode substrate 24c here is a metal foil, in particular, a copper foil.

At one end side 24e (right end part in FIG. 7) of the negative electrode substrate 24c in the width direction (long side direction Y), plural negative electrode tabs 24t are provided. The plural negative electrode tabs 24t protrude toward one side (right side in FIG. 7) in the long side direction Y. The plural negative electrode tabs 24t protrude to the long side direction Y more than the separator 26, The plural negative electrode tabs 24t are provided at intervals (intermittently) along a longitudinal direction of the negative electrode 24. Each of the plural negative electrode tabs 24t is formed in a trapezoidal shape. The negative electrode tabs 24t here is a part of the negative electrode substrate 24c, and consists of a metal foil (here, copper foil). The negative electrode tabs 24t here includes a portion (core body exposed part) of the negative electrode substrate 24c on which the negative electrode active material layer 24a is not formed. However, the negative electrode tabs 24t might be a member different from the negative electrode substrate 24c. In addition, the negative electrode tabs 24t might be provided at the other end part (left end part in FIG. 7) in the long side direction Y, or might be provided at both ends in the long side direction Y.

As shown in FIG. 4, the plural negative electrode tabs 24t are laminated at one end side 24e (right end part in FIG. 6) in the width direction (long side direction Y), and configure the negative electrode tab group 25. Sizes of the plural negative electrode tabs 24t (length in the long side direction Y and width orthogonal to the long side direction Y, see FIG. 7) can be suitably adjusted in consideration of a state of being connected to the negative electrode collecting member 60, for example, on the basis of the formed position, or the like. Respective sizes of the plural negative electrode tabs 24t here are mutually different to align the outer side ends when the plural negative electrode tabs are bent. The negative electrode tab group 25 is an example of the herein disclosed electrode tab group.

The negative electrode active material layer 24a is provided in a strip-like shape along the longitudinal direction of the strip-like shaped negative electrode substrate 24c. The negative electrode active material layer 24a contains a negative electrode active substance (for example, a carbon material, such as graphite, or a silicon type material, such as Si and SiO) that can reversibly store and release a charge carrier. When a total solid content of the negative electrode active material layer 24a is treated as 100 mass %, the negative electrode active substance might occupy approximately 80 mass % or more, typically 90 mass % or more, or, for example, 95 mass % or more. The negative electrode active material layer 24a might contain an arbitrary component other than the negative electrode active substance, for example, a binder, a dispersing agent, various additive components, or the like. As the binder, for example, rubbers, such as styrene butadiene rubber (SBR), can be used. As for the dispersing agent, it is possible, for example, to use celluloses, such as carboxymethyl cellulose (CMC).

A length of the negative electrode active material layer 24a in the width direction (wound axis WL direction) is not particularly restricted, but might be, for example, equal to or more than 20 cm, or equal to or more than 25 cm, By doing this, it is possible to make the nonaqueous electrolyte secondary battery 100 have a higher capacity. In addition, a length of the negative electrode active material layer 24a in the width direction can be, from a perspective of solving an uneven reaction of the electrode assembly 20a, for example, equal to or less than 50 cm, or equal to or less than 40 cm.

FIG. 8 is a cross section view that shows a structure at a vicinity of an end side 24e including the negative electrode tabs 24t of the negative electrode 24 in the electrode assembly 20a according to one embodiment. The negative electrode active material layer 24a includes the end side 24e and a first area 24r within a range of 5 mm from the end side 24e (range of W1 in the drawing) in the width direction (long side direction Y) of the negative electrode 24. One end part 22e in the width direction (long side direction Y) of the positive electrode 22 is arranged to be opposed to at least a part of the first area 24r via the separator 26. Regarding the present embodiment, in the width direction, the end part 22e of the positive electrode 22 is arranged to be opposed to a part of the first area, and the first area 24r includes an area 24r1 opposed to the end part 22e of the positive electrode 22 and an area. 24r2 opposed to the end part 22e of the positive electrode 22. Incidentally, the end side 24e of the negative electrode 24 is arranged at an inner side more than an end side of the end part 26e of the separator 26.

The negative electrode active material layer 24a on the first area 24r is configured to have a density lower than a density of the negative electrode active material layer 24a at the central part of the negative electrode 24. In particular, when a basis weight (mass of the negative electrode active material layer 24a per unit area) of the negative electrode active material layer 24a at the central part of the negative electrode 24 is represented by M1 and a basis weight (mass of the negative electrode active material layer 24a per unit area) of the negative electrode active material layer 24a at the area 24r1 opposed to the end part 22e of the positive electrode 22 on the first area 24r is represented by M2, the negative electrode 24 is configured to satisfy a condition: $0.95 < M2/M1 < 1$. In addition, it is preferable that the negative electrode 24 is configured to satisfy a condition: $0.95 < M2/M1 < 0.99$. By making the negative electrode active material layer 24a on the first area 24r be configured to have a comparatively lower density (in other words, $M2/M1 < 1$, or preferably $M2/M1 < 0.99$), it is facilitated to make the nonaqueous electrolyte permeate in the negative electrode active material layer 24a, and thus it is possible to enhance the liquid injection property. On the other hand, when a value of M2/M1 is too small, an amount of the negative electrode active substances contained in the negative electrode active material layer 24a at the area 24r1 opposed to the end part of the positive electrode 22 becomes smaller. By doing this, it will become insufficient to completely store lithium ions supplied from the opposed positive electrode active material layer 22a, and thus there are some fears of facilitating lithium precipitation. Therefore, by satisfying $0.95 < M2/M1$, the storage ability for the lithium ions can be secured so as to suppress the lithium precipitation.

Incidentally, in the present specification, as shown in FIG. 7, the central part of the negative electrode 24 means a square area whose one side is 2 cm and whose center is am intersection point of a straight line CL1 and a straight line CL3, while the straight line CL1 passes through the center of the electrode assembly 20a in the width direction (long side direction Y) and extends in the longitudinal direction and the straight line CL3 passes through the center of the width extending in the longitudinal direction of the positive electrode tabs 22t and extends in the protruding direction (long side direction Y) of the negative electrode tabs 24t.

In addition, the basis weight M2 means a basis weight of the negative electrode active material layer 24a in the area 24r1 opposed to the end part 22e of the positive electrode 22 in the first area 24r, within a range of 2 cm in the longitudinal direction of the negative electrode substrate 24c with the straight line CL3 treated as the center. Regarding the basis weight, for example, the negative electrode 24 within the range as described above is cut so as to prepare a test piece, the negative electrode active material layer 24a formed on one surface of this test piece is peeled off from the negative electrode substrate 24c, and then a mass of the peeled negative electrode active material layer can be measured.

The basis weight of the negative electrode active material layer 24a is, from a perspective of implementing a higher capacity, for example, appropriately equal to or more than 200 g/m$^2$, or preferably equal to or more than 220 g/m$^2$. In addition, from a perspective of decreasing a thickness of the electrode assembly 20a, the basis weight as described above is, for example, appropriately equal to or less than 400 g/m$^2$, or preferably equal to or less than 350 g/m$^2$. Incidentally; the basis weight described above means a basis weight for whole of the negative electrode active material layer 24a.

In the width direction (long side direction Y) of the negative electrode 24, it is preferable that a width (length) W2 of the area 24r1 opposed to the end part 22e of the positive electrode 22 on the first area 24r is larger than a width (length) W3 of the area 24r2 not opposed to the end part 22e of the positive electrode 22 (in other words, W2>W3). For example, when the width W1 of the first area 24r is treated as 100%, the width W2 of the area 24r1 opposed to the end part 22e of the positive electrode 22 is preferably equal to or more than 51% or further preferably equal to or more than 55%. By doing this, an area of the negative electrode 24 opposed to the positive electrode 22 becomes larger, and thus it is possible to implement the nonaqueous electrolyte secondary battery having the further higher capacity. In addition, although the present disclosure is not particularly restricted, by making the first area 24r include the area 24r2 not opposed to the end part 22e of the positive electrode 22, it is possible to suitably store the lithium ions capable of being diffused from the end part 22e of the positive electrode 22 at the electrically charging time. Thus, with respect to the width W1 of the first area 24r, the width W2 of the area 24r1 opposed to the end part 22e of the positive electrode 22 is, for example, appropriately equal to or less than 95% (in other words, width W3 of the area 24r2 not opposed to the end part of the positive electrode is equal to or more than 5%), or can be equal to or less than 90% (W3 can be equal to or more than 10%), or equal to or less than 85% (W3 can be equal to or more than 15%).

The width (length) W3 of the area 24r2 not opposed to the end part of the positive electrode 22 is typically equal to or more than 0.25 mm, or can be, for example, equal to or more than 0.5 mm, or equal to or more than 1 mm. In addition, the width (length) W3 of the area 24r2 not opposed to the end part of the positive electrode 22 is typically less than 3.5 mm, or can be, for example, equal to or less than 3 mm.

As shown in FIG. 8, in the present embodiment, on the first area 24r, an inclined part 24s is provided to make a thickness of the negative electrode active material layer 24a be gradually getting smaller toward the end side 24e. By providing the inclined part 24s, a gap is generated between the negative electrode active material layer 24a and the separator 26. By doing this, the nonaqueous electrolyte becomes capable of entering the gap as described above, and thus the liquid injection property of the electrode assembly 20a is enhanced. Incidentally, in the present embodiment, the inclined part 24s is provided on the whole of the first area 24r, but the present disclosure is not restricted to this, and, for example, at least a part of the first area 24r might include the inclined part 24s.

Regarding a thickness T3 of the negative electrode active material layer 24a at a central part of the negative electrode 24 and a thickness T4 of the negative electrode active material layer 24a at a position opposed to an end side of the positive electrode 22 on the first area 24r, T4/T3 is preferably equal to or more than 0.9 but less than 1.0, or further preferably equal to or more than 0.95 but less than 1.0. By doing this, it is possible to suitably implement enhancing the liquid injection property and securing the lithium ion storage ability for the negative electrode active substance. In addition, it is preferable that a ratio (T2/T1) of thicknesses of the above-described positive electrode active material layer 22a and a ratio (T4/T3) of the thicknesses of the negative electrode active material layer 24a satisfy T2/T1>T4/T3. Incidentally, in FIG. 8, the thickness of the negative electrode active material layer 24a at the central part of the negative electrode 24 and the thickness at the left end part of the negative electrode active material layer 24a in FIG. 8 are formed to be the same (in other words, thickness T3), The thickness T3 means an average thickness of the negative electrode active material layer 24a at the central part of the negative electrode 24. In addition, the thickness T4 means an average thickness of the negative electrode active material layer 24a opposed to the end side of the positive electrode 22 on the first area 24r, within a range of 2 cm in the longitudinal direction of the negative electrode substrate 24c with the straight line CL3 treated as the center.

Figure 9:
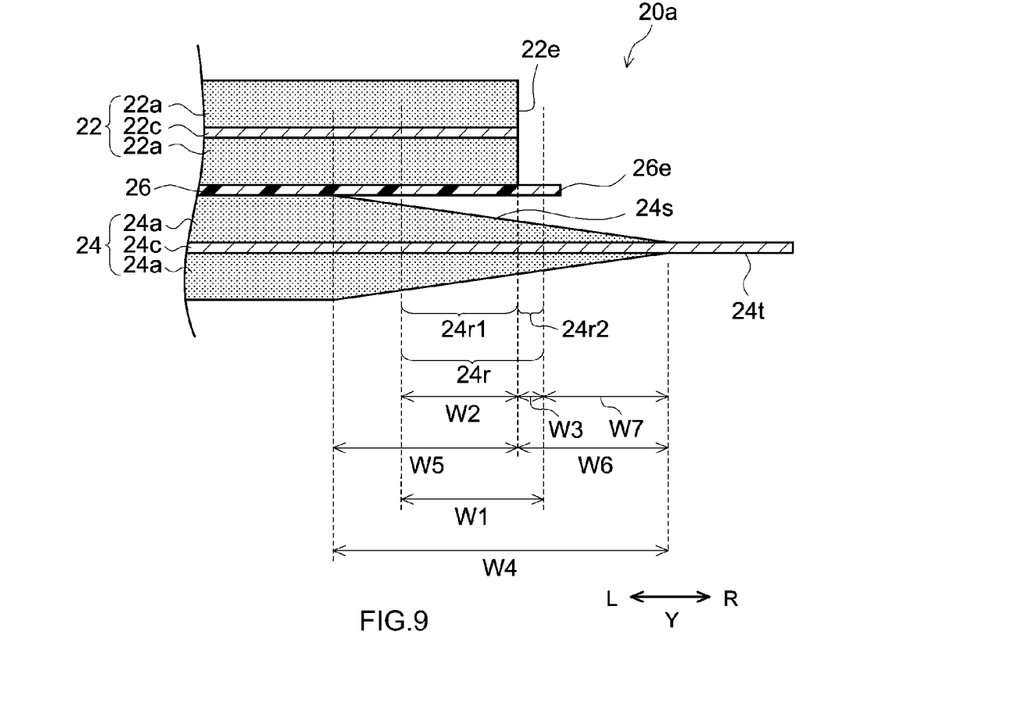
FIG. 9 is a cross section view that shows a structure at a vicinity of the negative electrode tabs of the negative electrode on the electrode assembly in accordance with one embodiment.

FIG. 9 is a cross section view that shows a structure at a vicinity of the negative electrode tabs 24t of the negative electrode 24 for the electrode assembly 20a in accordance with one embodiment. As shown in FIG. 9, in the present embodiment, the negative electrode active material layer 24a protrudes from the end part 26e of the separator 26 in the protruding direction of the negative electrode tabs 24t (right direction of FIG. 9) and formed on the negative electrode tabs 24t, too. By doing this, even when the negative electrode substrate 24c is cut to form the negative electrode tabs 24t and then a burr is caused on the cut part of the negative electrode substrate 24c, it is possible to dispose the negative electrode active material layer 24a between the burr and the separator 26, and thus it is possible to inhibit the burr from damaging the separator 26.

The length W4 of the inclined part 24s of the negative electrode active material layer 24a in the width direction is, from a perspective of enhancing the liquid injection property, for example, preferably equal to or more than 5 mm, or further preferably equal to or more than 8 mm. In addition, the length W4 is, from a perspective of securing the opposed capacity ratio, for example, preferably equal to or less than 20 mm, or further preferably equal to or less than 18 mm.

In addition, a length W5 of an area opposed to the positive electrode active material layer 22a at the inclined part 24s of the negative electrode active material layer 24a in the width direction is, from a perspective of enhancing the liquid injection property; preferably equal to or more than 3 mm, or further preferably equal to or more than 4 mm. In addition, from a perspective of implementing the higher capacity, the length W5 is, for example, equal to or less than 10 mm, or preferably equal to or less than 8 mm.

With respect to the length W5 of the area opposed to the positive electrode active material layer 22a at the inclined part 24s of the negative electrode active material layer 24a in the width direction and a length W6 in the width direction from the end side of the negative electrode active material layer 24a on the negative electrode tabs 24t to a position where the negative electrode active material layer 24a is opposed to the end side of the positive electrode 22, the ratio (W5/W6) of the lengths is preferably equal to or more than 0.6, further preferably equal to or more than 0.8, or furthermore preferably equal to or more than 1. By satisfying the rate as described above, it is possible to further enhance the liquid injection property. In addition, in order to make the negative electrode active material layer 24a protrude to the protruding direction of the negative electrode tabs 24t from the end part 26e of the separator 26, for example, the ratio (W5/W6)) of these lengths is appropriately equal to or less than 3, or, for example, can be equal to or less than 2.

A length W7 from the end side of the negative electrode active material layer 24a on the negative electrode tabs 24t to the end side 24e of the negative electrode 24 in the width direction (in other words, width (length) of the negative electrode active material layer 24a on the negative electrode tabs 24t) is, from a perspective of inhibiting the burr, capable of being caused at the time of forming the negative electrode tabs 24t, from damaging the separator 26, for example, equal to or more than 1.2 mm, or preferably equal to or more than 2 mm. In addition, from a perspective of securing the area of the exposed part of the negative electrode substrate 24c provided for joining the negative electrode tabs 24t and the negative electrode second electrical collector part 62, the length W7 is, for example, preferably equal to or less than 5 mm, or further preferably equal to or less than 4 mm.

With respect to the width (length) W7 of the negative electrode active material layer 24a on the negative electrode tabs 24t in the width direction and the width (length) W3 of the area 24r2 not opposed to end part 22e of the positive electrode 22 on the area 24r, the ratio (W7/W3) of the lengths is preferably equal to or more than 1, or further preferably equal to or more than 1.2. In addition, the ratio (W7/W3) of the lengths described above is, for example, equal to or less than 15, or can be equal to or less than 10, equal to or less than 5, or equal to or less than 2.

A surface roughness Ra of a surface coming into contact with the separator 26 of the negative electrode active material layer 24a is, for example, 0.4 μm to 0.8 μm. In addition, it is preferable that the surface roughness of the surface coming into contact with the separator 26 of the negative electrode active material layer 24a is larger than a surface roughness of a surface coming into contact with the separator 26 of the positive electrode active material layer 22a. By doing this, it becomes easily generating a gap between the negative electrode active material layer 24a and the separator 26, so as to enhance the liquid injection property.

Below, an example of the manufacturing method of the electrode assembly 20a will be described. The manufacturing method of the electrode assembly 20a, for example, includes a negative electrode precursor preparation step, a negative electrode precursor cut step, and an electrode assembly construction step. Incidentally, the herein disclosed manufacturing method might further include another step at an arbitrary stage.

At the negative electrode precursor preparation step, a paste for forming the negative electrode active material layer is applied to coat both surfaces of the negative electrode substrate 24c formed in a strip-like shape, and then the resultant is dried so as to form the negative electrode active material layer 24a. At that time, on the end part of the negative electrode substrate 24c in the width direction, so-called sags occur on the applied coating paste, and thus the thickness of the end part of the formed negative electrode active material layer is gradually smaller toward the end side. Thus, at the portion on which the sags occur, the basis weight of the negative electrode active material layer becomes relatively smaller. Therefore, at the portion on which the sails occur, the lithium ion storage ability of the negative electrode active material layer becomes relatively lower, and then, by making this portion be opposed to the positive electrode, it happens to facilitate causing the precipitate.

Then, at the negative electrode precursor cut step, the end part of the negative electrode precursor is cut in order to remove the portion on which the sags occur. At that time, not by cutting and removing all the portion on which the sags occur, but by intentionally cutting with some of the sags remaining, it is possible to implement the negative electrode 24 satisfying a condition: 0.95<M2/M1<1, with respect to the basis weight M1 of the negative electrode active material layer 24a at the central part of the negative electrode 24 and the basis weight M2 of the negative electrode active material layer 24a at the area 24r1 opposed to the end part 22e of the positive electrode 22 on the first area 24r. Incidentally, the cut part generated at that time is the end side 24e of the negative electrode 24. In addition, at the negative electrode precursor cut step, the end part of the negative electrode precursor might be processed in order to form the negative electrode tabs 24t. The cut method for the negative electrode precursor is not particularly restricted, but, for example, it is possible to suitably use laser cutting.

At the electrode assembly construction step, the positive electrode 22 and the negative electrode 24 are laminated via the separator 26, and then pressed from the laminate direction, so as to construct the electrode assembly 20a. The press method can be performed according to a conventionally known method. The electrode assembly 20a described above is a wound electrode assembly, and thus is wound about the wound axis treated as the center before being pressed. At the electrode assembly construction step, adjustment is performed to implement a position relation that the end part 22e of the positive electrode 22 is opposed to at least a part of the first area 24r of the negative electrode 24. From a perspective of suppressing the shift of the position relation, the separator 26 whose both surfaces are provided with adhesion layers is suitably used. In general, when the separator 26 including the adhesion layer is used, it becomes difficult to generate a gap between the separator 26 and the positive electrode active material layer 22a and negative electrode active material layer 24a, and thus it tends to deteriorate the liquid injection property. However, regarding the manufactured negative electrode 24 as described above, the basis weight at the end part (portion on which the sags occur) of the negative electrode active material layer 24a is relatively lower, and thus it is possible to weaken the adhesion of the adhesion layer to the negative electrode active material layer 24a at the vicinity of the end part. Particularly, since the sags (inclined part) remain at the end part of the negative electrode active material layer 24a, it becomes hard to make the adhesion layer adhere to the inclined part even with the press being performed, and then the adhesion becomes weak or does not work. By doing this, even when the separator 26 including the adhesion layer is used, it becomes easy to make the nonaqueous electrolyte invade into the negative electrode active material layer, and therefore it is possible to enhance the liquid injection property.

The nonaqueous electrolyte secondary battery 100 can be used for various purposes, and thus, for example, can be preferably used as a driving power supply for a plug-in hybrid electric vehicle (PHEV), a hybrid electric vehicle (HEV), a battery electric vehicle (BEV), or the like. The nonaqueous electrolyte secondary battery 100 can be suitably used as a battery pack by arranging a plurality of nonaqueous electrolyte secondary batteries 100 in a predetermined arrangement direction and by making a binding mechanism add a load from the arrangement direction.

Incidentally, as an example, the nonaqueous electrolyte secondary battery 100 including the square battery case 10 is explained, but the present disclosure is not particularly restricted to this. For example, it might be a cylindrical shape nonaqueous electrolyte secondary battery including a battery case formed in a cylindrical shape, instead of the square battery case 10, a laminate-type nonaqueous electrolyte secondary battery including a laminate film, instead of the battery case 10, or the like.

Above, the embodiments for the present technique are explained, but the above-described embodiments are merely examples. The present technique can be implemented in other various forms. The technique recited in the appended claims includes variously deformed or changed versions of the embodiments that have been illustrated above. For example, one part of the above-described embodiment can be replaced with another deformed aspect, and furthermore another deformed aspect can be added to the above-described embodiment. In addition, unless a technical feature is explained to be essential, this technical feature can be appropriately deleted.

Figure 10:
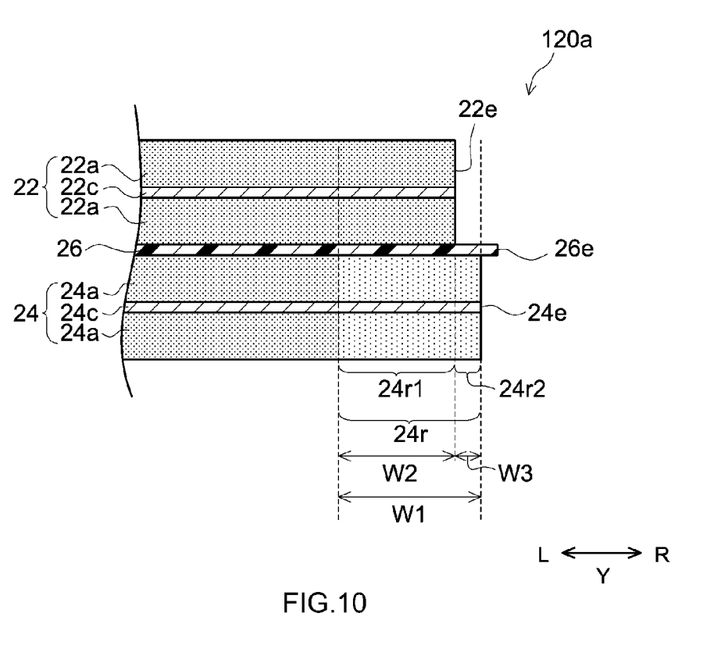
FIG. 10 is a cross section view that shows a structure at a vicinity of the end side including the negative electrode tabs of the negative electrode of the electrode assembly in accordance with another embodiment.

For example, in the above-described embodiment, the negative electrode active material layer 24a includes the inclined part 24s. However, the present disclosure is not restricted by this. For example, as if the electrode assembly 120a. shown in FIG. 10, no inclined part might be formed on the first area 24r of the negative electrode active material layer 24a. Even in this case, by making the basis weight M1 of the negative electrode active material layer 24a at the central part of the negative electrode 24 and the basis weight M2 of the negative electrode active material layer 24a at the area 24r1 opposed to the end part 22e of the positive electrode 22 on the first area 24r satisfy the condition: 0.95<M2/M1<1, the electrolyte becomes easy to be permeated in the negative electrode active material layer 24a, and thus it is possible to enhance the liquid injection property.

What is claimed is:

1. A nonaqueous electrolyte secondary battery, comprising:
    an electrode assembly in which a positive electrode, a negative electrode, and a separator that is arranged between the positive electrode and the negative electrode are provided, wherein
    the positive electrode comprises a positive electrode substrate and positive electrode active material layers disposed on both surfaces of the positive electrode substrate,
    the negative electrode comprises a negative electrode substrate and negative electrode active material layers disposed on both surfaces of the negative electrode substrate,
    at one end side of the negative electrode in a width direction, negative electrode tabs are provided that are configured with a part of the negative electrode substrate and protrude from the end side,
    the negative electrode active material layer comprises a first area between the end side and a position 5 mm away from the end side in the width direction of the negative electrode,
    an end part of the positive electrode is opposed to at least a part of the first area via the separator,
    a relation of a thickness T1 of the positive electrode active material layer at a central part of the positive electrode and a thickness T2 of the positive electrode active material layer at an end part of the positive electrode satisfies 0.95<T2/T1<1.05, and
    a basis weight (mass of the negative electrode active material layer per unit area) M1 of the negative electrode active material layer at a central part of the negative electrode and a basis weight (mass of the negative electrode active material layer per unit area) M2 of the negative electrode active material layer at an area opposed to the positive electrode active material layer on the first area satisfy a following condition: 0.95<M2/M1<1.

2. The nonaqueous electrolyte secondary battery according to claim 1, wherein on the first area, the negative electrode active material layer is disposed to have a thickness of the negative electrode active material layer being gradually smaller toward the end side.

3. The nonaqueous electrolyte secondary battery according to claim 1, wherein
    the positive electrode comprises positive electrode tab configured with a part of the positive electrode substrate, and
    the electrode assembly comprises a plurality of the negative electrode tabs at one end part, and comprises a plurality of the positive electrode tabs at another end part.

4. The nonaqueous electrolyte secondary battery according to claim 1, wherein
    the electrode assembly is a wound electrode assembly in which the positive electrode disposed in a strip-like shape and the negative electrode disposed in a strip-like shape are wound via the separator disposed in a strip-like shape.

5. The nonaqueous electrolyte secondary battery according to claim 4, wherein
    a width of the negative electrode active material layer in a wound axis direction of the wound electrode assembly is equal to or more than 20 cm.

6. The nonaqueous electrolyte secondary battery according to claim 1, further comprising:
    a negative electrode tabs group configured with plural ones of the negative electrode tabs being laminated; and
    a negative electrode collecting member electrically connected to the negative electrode tabs, wherein
    the negative electrode tabs group is folded and bent so as to be connected to the negative electrode collecting member.

7. The nonaqueous electrolyte secondary battery according to claim 1, wherein
    both surfaces of the separator are provided with adhesion layers.

8. The nonaqueous electrolyte secondary battery according to claim 1, wherein
    the negative electrode active material layer protrudes from an end part of the separator in a protruding direction of the negative electrode tabs and is disposed on the negative electrode tabs.

9. The nonaqueous electrolyte secondary battery according to claim 1, wherein
    the first area comprises an area not opposed to the positive electrode active material layer, and
    in a width direction of the negative electrode, a width W2 of the area opposed to the positive electrode on the first area is larger than a width W3 of the area not opposed to the positive electrode on the first area.

* * * * *